(12) United States Patent
Kuhlman et al.

(10) Patent No.: US 8,305,678 B2
(45) Date of Patent: Nov. 6, 2012

(54) DUAL VIEW DISPLAY SYSTEM

(75) Inventors: Frederick F. Kuhlman, Kokomo, IN (US); Andrew P. Harbach, Kokomo, IN (US); Dwadasi H. R. Sarma, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 12/980,475

(22) Filed: Dec. 29, 2010

(65) Prior Publication Data

US 2012/0170108 A1 Jul. 5, 2012

(51) Int. Cl.
G02B 26/08 (2006.01)
G02B 27/00 (2006.01)
G02B 27/14 (2006.01)
G02F 1/1335 (2006.01)
G09G 5/00 (2006.01)

(52) U.S. Cl. ........ 359/298; 359/613; 359/630; 359/609; 359/610; 349/66; 345/8; 340/435; 340/439; 340/475

(58) Field of Classification Search ............... 359/267, 359/464, 609, 610, 613, 618, 630, 298; 345/7–9, 345/32, 85, 87; 340/435, 439, 475; 362/606; 349/65, 66; 348/53
See application file for complete search history.

(56) References Cited

U.S. PATENT DOCUMENTS

| | | | | |
|---|---|---|---|---|
| 4,883,769 A | * | 11/1989 | Au Coin et al. | 438/508 |
| 5,686,979 A | | 11/1997 | Weber et al. | |
| 5,854,706 A | * | 12/1998 | Alb | 359/465 |
| 5,930,927 A | * | 8/1999 | Griffin et al. | 40/621 |
| 6,449,094 B1 | * | 9/2002 | Ishii | 359/565 |
| 6,674,504 B1 | | 1/2004 | Li et al. | |
| 6,697,201 B2 | * | 2/2004 | Watanabe et al. | 359/630 |
| 6,999,649 B1 | | 2/2006 | Chen et al. | |
| 7,242,446 B2 | * | 7/2007 | Usami | 349/66 |
| 7,859,738 B2 | * | 12/2010 | Baur et al. | 359/267 |
| 8,104,921 B2 | * | 1/2012 | Hente et al. | 362/235 |

(Continued)

FOREIGN PATENT DOCUMENTS

GB 2405545 3/2005

OTHER PUBLICATIONS

U.S. Appl. No. 12/840,526, filed Jul. 21, 2010.

(Continued)

*Primary Examiner* — Loha Ben
(74) *Attorney, Agent, or Firm* — Lawrence D. Hazelton

(57) ABSTRACT

A dual view display system that includes a display device and a first louver device. The display device is configured to display a first image at a display location to a first person at a first location and display a second image at the display location to a second person at a second location. The first louver device configured to substantially restrict a first field of view of the first image to the first person. The system may also include a second louver device configured to substantially restrict a second field of view of the second image to the second person. Such an arrangement restricts the fields of view so that, for example, a vehicle driver can not lean over and view something intended only for a vehicle passenger, such as a movie.

8 Claims, 5 Drawing Sheets

U.S. PATENT DOCUMENTS

| | | |
|---|---|---|
| 2007/0035565 A1 | 2/2007 | Kerofsky |
| 2007/0069978 A1 | 3/2007 | Daiku |
| 2008/0018555 A1* | 1/2008 | Kuo et al. .................... 345/8 |
| 2008/0084614 A1 | 4/2008 | Dobrusskin |
| 2010/0091226 A1 | 4/2010 | Takatani et al. |
| 2011/0157708 A1* | 6/2011 | Kuo et al. .................... 359/630 |

OTHER PUBLICATIONS

U.S. Appl. No. 12/840,576, filed Jul. 21, 2010.
U.S. Appl. No. 12/852,647, filed Aug. 9, 2010.
U.S. Appl. No. 12/881,242, filed Sep. 14, 2010.
European Search Report dated Dec. 13, 2011.

* cited by examiner

DUAL VIEW DISPLAY SYSTEM

TECHNICAL FIELD OF INVENTION

The invention generally relates to dual view displays for displaying images or information in distinct directions to distinct locations, and more particularly relates to a system that restricts the field of view of an image to a person viewing the image from a particular direction or location.

BACKGROUND OF INVENTION

Dual view displays capable of showing different images to distinct persons viewing the display from different directions or locations have been proposed. Such displays can, for example, display navigation information to a vehicle operator while displaying a movie to a passenger. Some of the known dual view displays use a parallax barrier or patterned barrier to allow selected pixels on a display to be viewed from one direction and blocked when viewed from another direction. A description of such displays can be found in United States Patent Application Publication Number 2008/0001849 published Jan. 3, 2008 by Jin et al. and 2008/0061305 published Mar. 13, 2008 by Kim et al. Other dual view displays use a segmented backlighting source that directs light or emits light in a particular direction toward selected pixels by emitting light through apertures. The apertures are aligned with the pixels such that when the selected pixels are viewed from that particular direction, the selected pixels are more apparent than when viewed from another direction. A description of such a display can be found in U.S. Pat. No. 7,671,935 issued on Mar. 2, 2010 to Mather et al. In general, prior art devices rely on parallax angles and interlacing of images to display distinct images in different directions, and so the direction that each image is displayed depends on careful control of lateral alignment and separation distance between the pixels and the parallax barrier or segmented backlighting source.

SUMMARY OF THE INVENTION

In accordance with one embodiment of this invention, a dual view display system is provided. The system includes a display device, and a first louver device. The display device is configured to display a first image at a display location to a first person at a first location and display a second image at the display location to a second person at a second location. The first louver device is configured to substantially restrict a first field of view of the first image to the first person.

In accordance with an embodiment of this invention, the system also includes a second louver device configured to substantially restrict a second field of view of the second image to the second person.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION OF INVENTION

Figure 1:
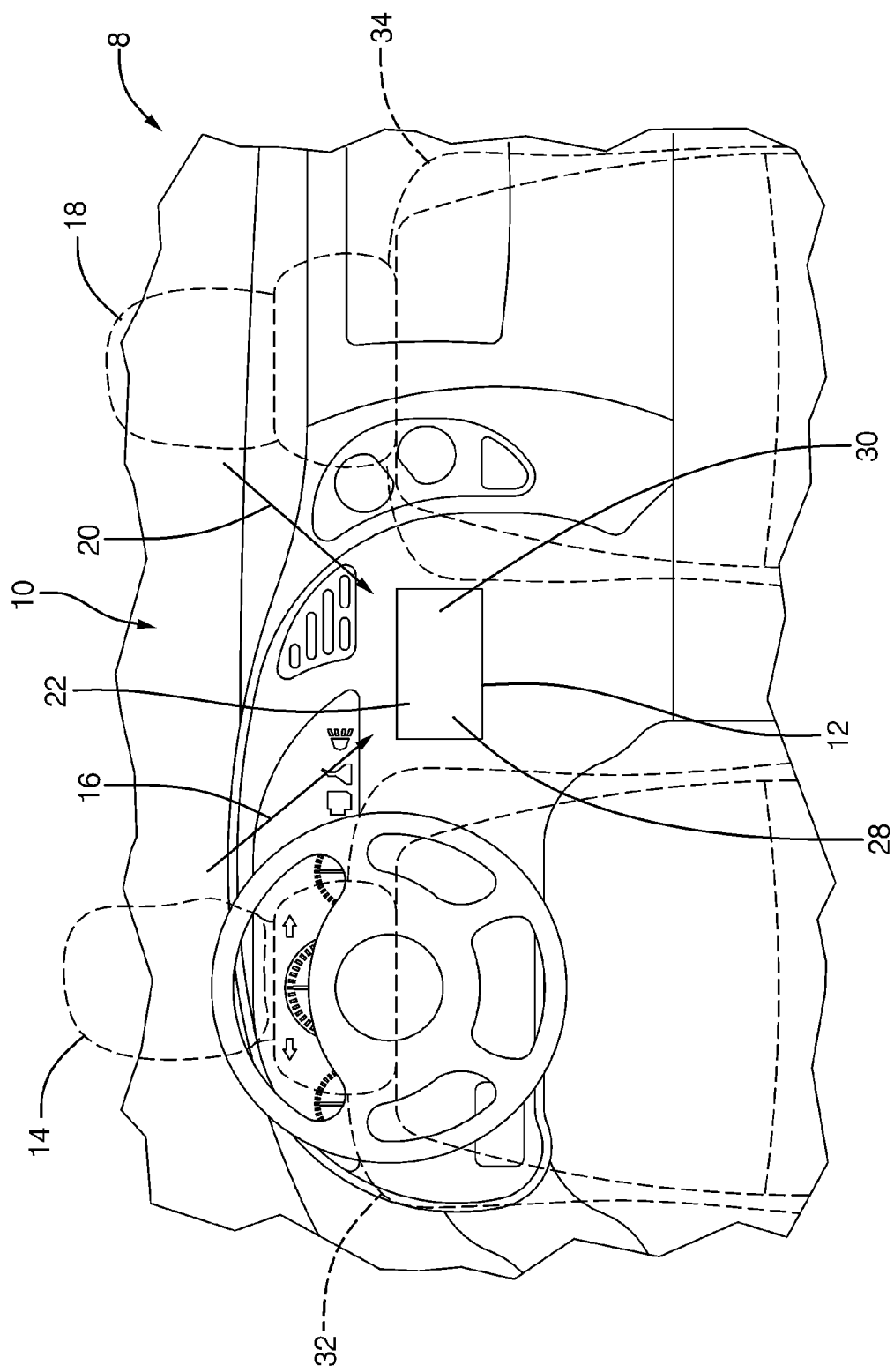
FIG. 1 is a perspective view of vehicle interior equipped with a dual view display system in accordance with one embodiment.

In accordance with an embodiment of a dual view display system 10, FIG. 1 illustrates a non-limiting example of a vehicle interior 8 equipped with a dual view display system 10 located at a display location 22 on a dashboard of the vehicle interior 8. The system 10 is generally configured so a first person 14, for example a vehicle driver, may view a first image 24 (FIG. 2) from a first direction 16, or from a first location 32 such as a driver's seat; and a second person 18, for example a vehicle passenger, may view a second image 26 from a second direction 20 or a second location 34 such as a passenger's seat. It is noted that the first direction 16 and the first location are distinct from the second direction 20 and the second location 34. The system 10 may include a display device 12 configured to display the first image 24 at the display location 22 to the first person 14 at the first location 32 and display the second image 26 at the display location 22 to the second person 18 at the second location 34. Such a dual view display system 10 may, for example, display navigation information as the first image 24 to the first person 14 while also displaying a movie as the second image 26 to the second person 18. By this arrangement, the system 10 appears to display two distinct images in two different directions to two different locations for viewing by different persons viewing the display device 12. As such, the system 10 is distinguished from 3-D display systems that display two similar images for viewing by the same person from the same general direction or location.

Figure 2:
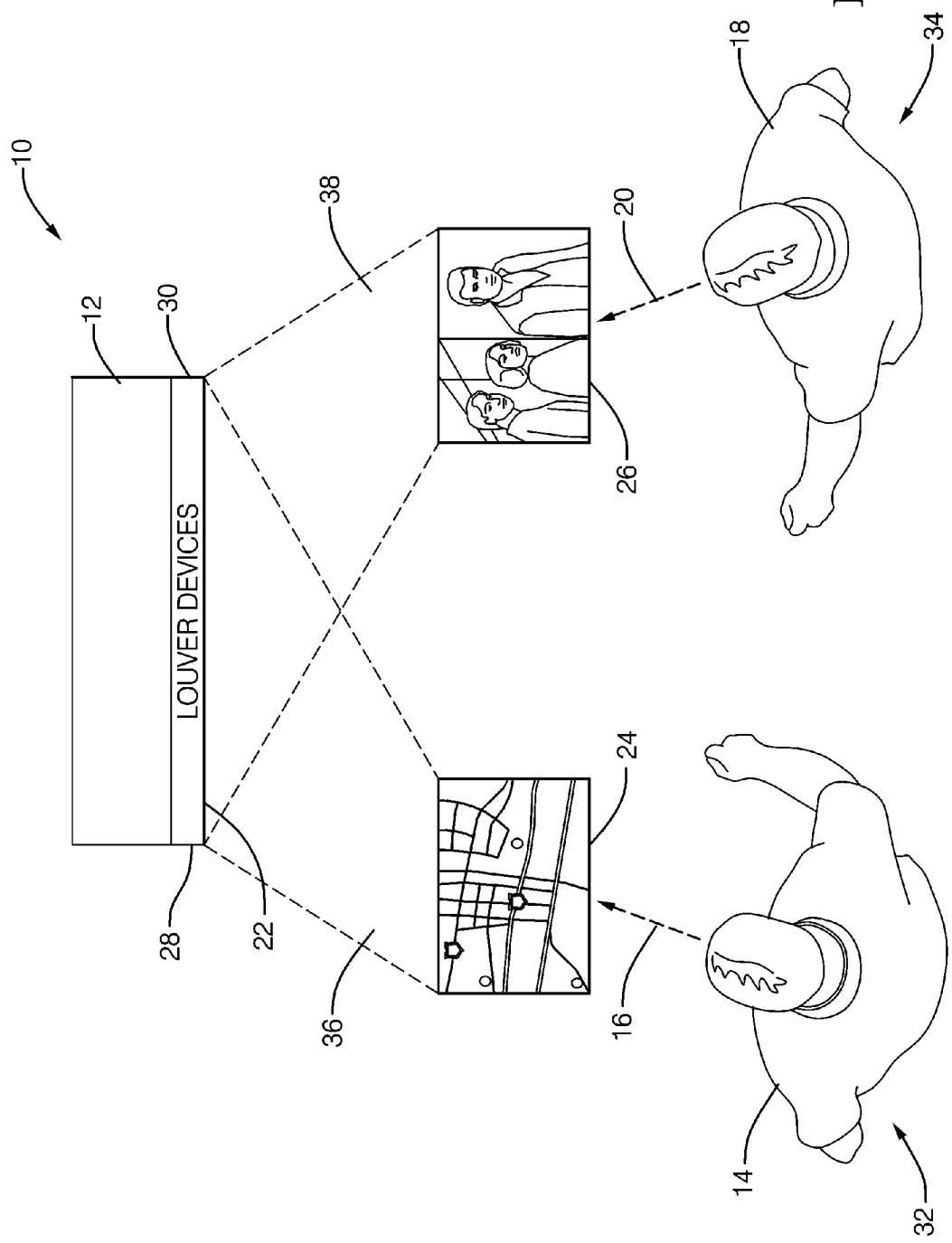
FIG. 2 is a top view of a dual view display of FIG. 1 in accordance with one embodiment.

FIG. 2 illustrates a top sectional view of an embodiment of a system 10 that includes a display device 12, and a first louver device 28. As used herein, a louver device allows a person to look through the louver device from a particular angle, and prevents the person to look through the louver device from some other angles. A louver device may be used when it is desirable to prevent persons from viewing an image from directions other than the particular angle to which the louver is aligned. The first louver device 28 preferably overlays the display device 12 at the display location 22. In one embodiment, the first louver device 28 may include a layer of advanced light control film, for example Vikuiti™ Advanced Light Control Film (ALCF) manufactured by 3M Corporation. As such, the first louver device 28 may be configured to substantially restrict a first field of view 36 of the first image 24 to the first person 14.

In another embodiment, the system 10 may also include a second louver device 30 configured to substantially restrict a second field of view 38 of the second image 26 to the second person 18. As suggested in FIG. 2, and as will be explained in more detail below, the first louver device 28 a second louver device 30 may be integrated into a single part labeled LOUVER DEVICES that is overlaying the display device 12. It follows that both the first louver device 28 and the second louver device 30 could include a layer of ALCF. The system 10 may include known dual view display features at the interface between the display device 12 and the first louver device 28 that generally direct the first image 24 into the first field of view 36 and the second image 26 into the second field of view 38, and so the first louver device 28 and the second louver device only serve to restrict or narrow the fields of view 36 and 38. However, costs may be reduced if the system 10 does not include such features, and so the first louver device 28 and the second louver device 30 serve to direct first image 24 and the second image 26 in the desired directions as well as restrict the fields of view.

Buy way of example and not limitation, equipping a dual view display system with louvers may be desirable to prevent the driver from being distracted from operating the vehicle by whatever image the passenger is viewing, for example a movie. The degree to which a field of view is restricted may be different for different directions or locations. For example, it may be desirable to more severely restrict the field of view directed to the passenger so the driver is discouraged from leaning far enough toward the passenger to view the image directed to the passenger. On the other hand, it may be desirable to less severely restrict the field of view shown to the driver so the passenger could readily lean over enough to view the image directed to the driver. Furthermore, the system 10 may be configured to display a third image, for example to a person sitting between the first person 14 and the second person 18, by configuring the display device 12 to display a third image to a third location and add a third louver device to restrict the viewing angle to the third location.

Figure 3:
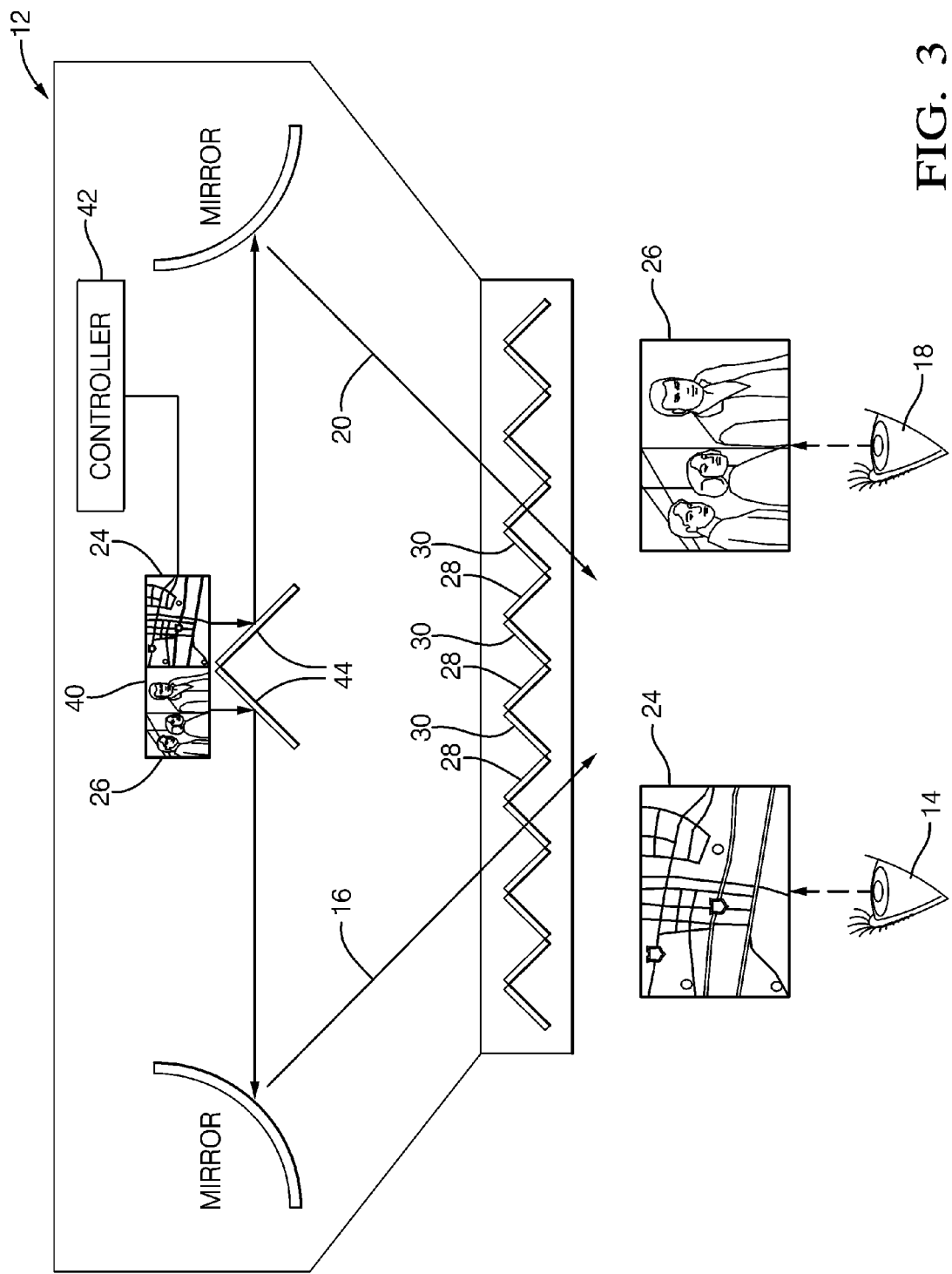
FIG. 3 is a top view of a dual view display of FIG. 1 in accordance with one embodiment.

FIG. 3 illustrates an embodiment of the system 10 that includes a display device 12, a first louver device 28, and optionally a second louver device 30. The display device 12 includes a display element 40 configured to display the first image 24 on a first portion of the display element 40 and display the second image 26 on a second portion of the display element 40 distinct from the first portion. The image display function of the display element 40 may be provided by any of a variety of technologies including, but not limited to, electroluminescent, projection, LED, LCD organic light emitting diode (OLED) type device, or a liquid crystal display (LCD) type device. With this configuration, the display element 40 can simultaneously display both images. The display device 12 may also include a controller 42 that receives information from other vehicle systems, for example, but not limited to, a navigation system 52 (FIG. 5), a vehicle information system 54, or an entertainment system 56. The controller 42 may include a processor such as a microprocessor or other control circuitry as should be evident to those skilled in the art. The controller 42 may include memory, including non-volatile memory, such as electrically erasable programmable read-only memory (EEPROM) for storing one or more routines and captured data. The one or more routines may be executed by the processor to perform steps for determining if signals are received by the controller 42 and for outputting a signal to the display element for displaying images as described herein.

The display device 12 may also include an optical element 44 configured to direct the first image 24 to the first person 14 and direct the second image 26 to the second person 18. In this non-limiting example, the optical element 44 is illustrated as an image splitting fixed mirror that directs the first image 24 to the first person 14 and the second image 26 to the second person 18 via curved minors as illustrated. An advantage of this arrangement is that the images do not need to be multiplexed as is the case for another embodiment described below.

Figure 4:
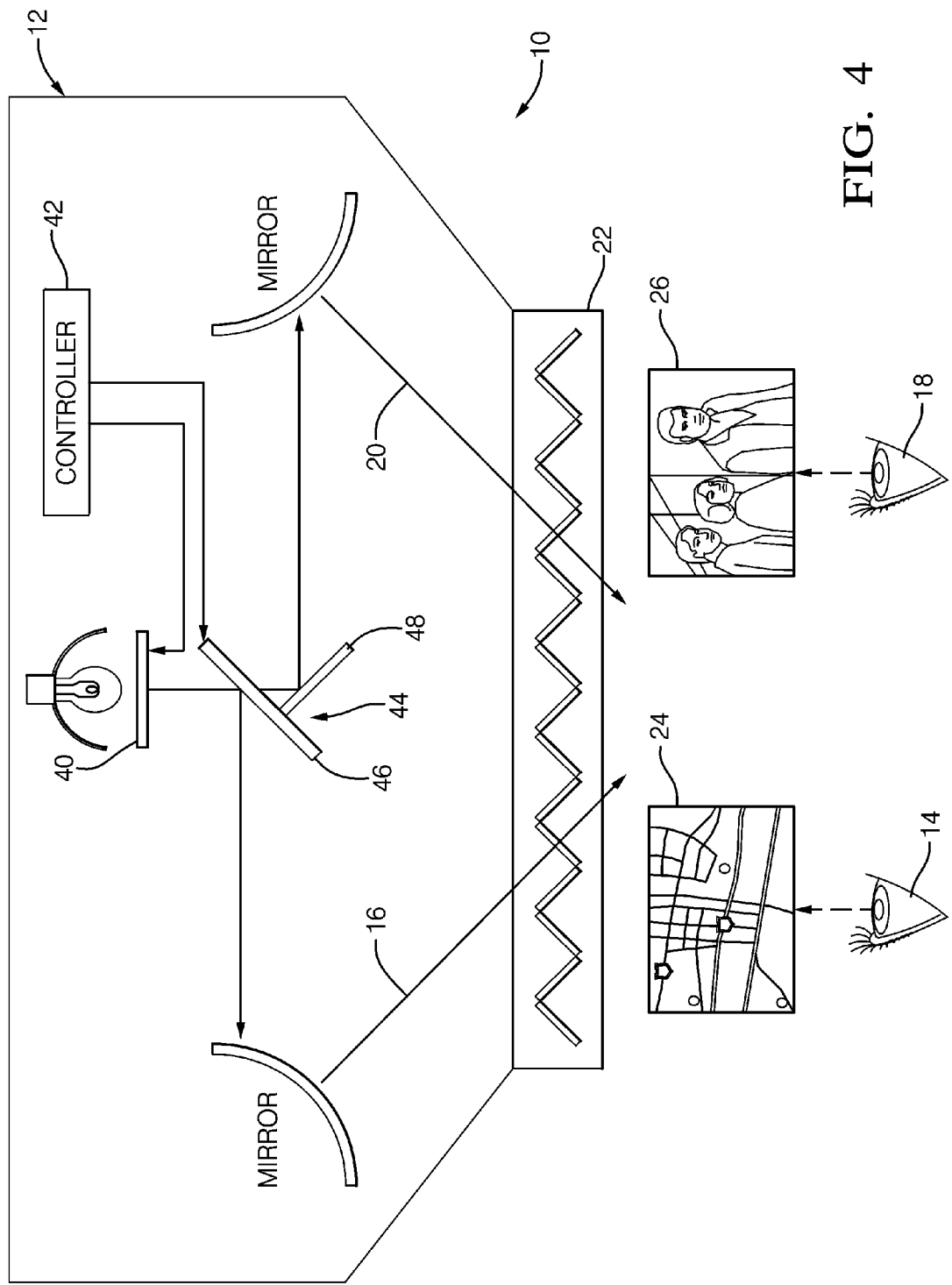
FIG. 4 is a top view of a dual view display of FIG. 1 in accordance with one embodiment.
Figure 6:
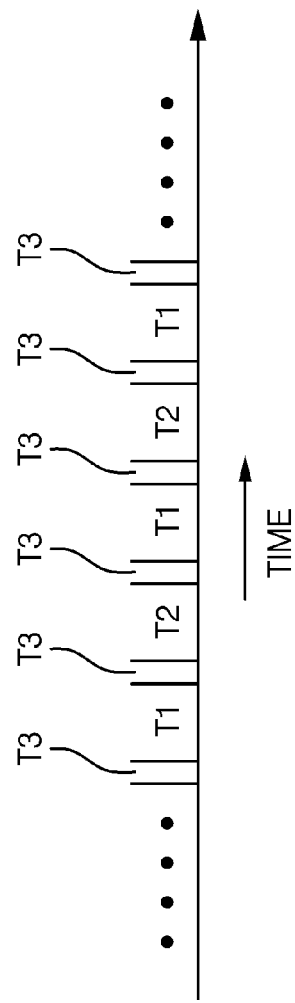
FIG. 6 is a timing diagram of an operation in the dual view display system of FIG. 1 in accordance with one embodiment.

FIG. 4 illustrates another embodiment of the system 10 that includes a display device 12, a first louver device 28, and optionally a second louver device 30. In this embodiment, the display device 12 includes a display element 40 configured to display the first image 24 during a first time period T1 (FIG. 6) and display the second image 26 during a second time period T2 distinct from the first time period T1. In this embodiment an optical element 44 is again interposed between the display element 40 and the display location 22. However in this embodiment, the optical element 44 cooperates with the display element 40 that time-multiplexes the first image 24 and the second image 26. As such, the optical element 44 is configured to direct the first image 24 to the first person 14 during the first time period T1 and direct the second image 26 to the second person 18 during the second time period T2. In one embodiment the optical element 44 may include a switchable mirror 46 and a fixed minor 48. The switchable minor 46 may be generally described as being operable to two states: transparent or reflective. For example, an LCD filled with crystals that are reflective in one state is available from Kentoptronics, or an electrowetting cell filled with liquid gallium, or an electrochromic minor. A more detailed description of how to time-multiplex and direct images for dual view displays can be found in U.S. patent application Ser. No. 12/853,647, filed Aug. 9, 2010 by the same inventors as this application (Kuhlman et al.), and commonly assigned to Delphi Technologies Inc., the entire contents of which are hereby incorporated by reference herein.

Figure 5:
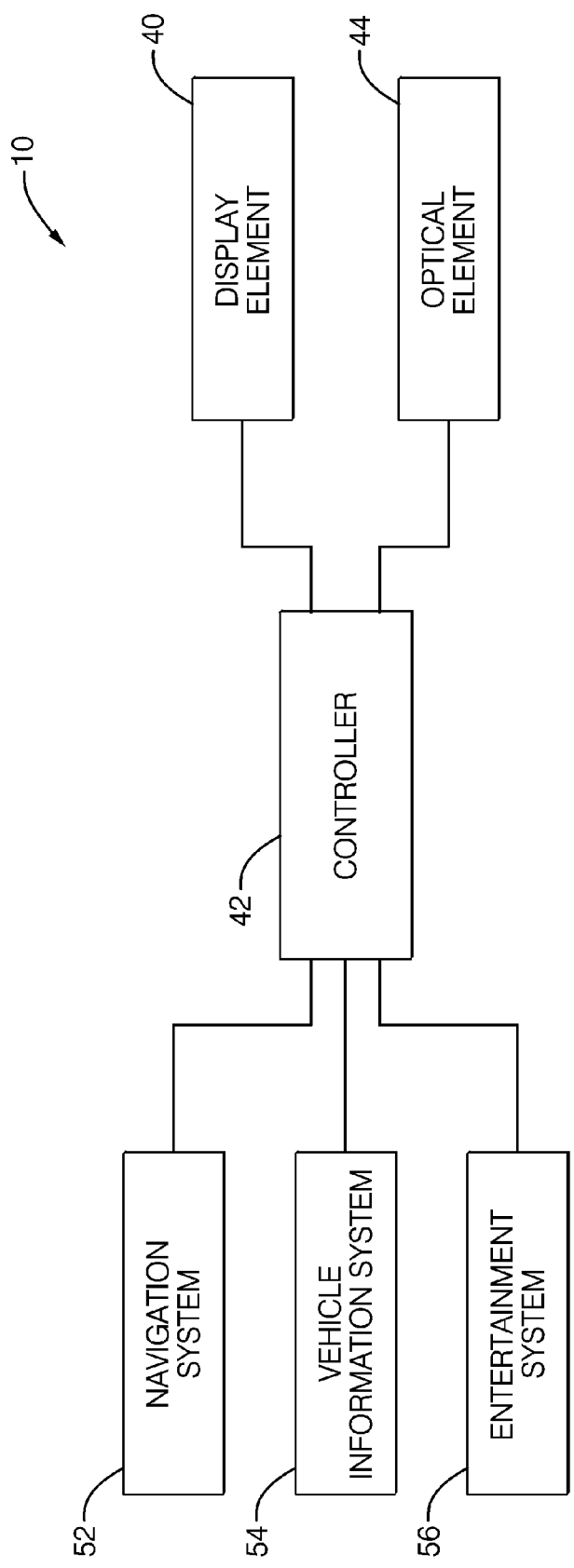
FIG. 5 is a block diagram of the dual view display system of FIG. 1 in accordance with one embodiment.

FIG. 5 illustrates a block diagram as a non-limiting example of the dual view display system 10. As suggested in the illustration, the controller 42 may receive an image signal from a navigation system 52 that, for example, shows the present geographical location of the system 10. The controller 42 may also receive information regarding vehicle operating status from a vehicle information system 54. The vehicle operating status may include, for example, engine coolant temperature or vehicle interior heating and air conditioning settings. The controller 42 may also receive entertainment information from an entertainment system 56. Entertainment information may include a pre-recorded movie. For reasons of avoiding distracting the first person 14, it may be desirable that the movie information only be displayed to the second person 18. It will be appreciated that the dual view display system 10 may be used for non-vehicle applications where the controller 42 would receive signals from sources other than the systems 52, 54, and 56 suggested in FIG. 5. It will also be appreciated that the same image could be displayed to both the first person 14 and the second person 18 so, for example, both persons could view navigational information. The controller 42 is also configured to output a signal to the display element 40 that may include the first image 24 and the second image 28. If the system includes an optical element 44 that includes a device that requires a control signal, such as suggested in FIG. 4, the controller 42 may also provide the control signal.

Accordingly, a dual view display system 10 for displaying different images in different directions from a common display location 22 is provided. By using an optical element 44, a system 10 displaying two distinct images may be provided for less cost than two separate displays. The arrangement of the display device 12 and optical element 44 do not require precise physical alignment as is the case with other dual view displays, particularly those relying on parallax to control the direction that images are displayed. Furthermore, in at least one embodiment described herein the full resolution of the display device is maintained for both images, unlike the parallax based dual view display devices that halve the resolution of each image relative to the resolution of the display to display two distinct images.

While this invention has been described in terms of the preferred embodiments thereof, it is not intended to be so limited, but rather only to the extent set forth in the claims that follow.

We claim:

1. A dual view display system comprising:
   a display device configured to display a first image at a display location to a first person at a first location and display a second image at the display location to a second person at a second location; and
   a first louver device configured to substantially restrict a first field of view of the first image to the first person, wherein the first louver device includes a layer of advanced light control film.

2. The system in accordance with claim 1, wherein the first louver device overlays the display device.

3. The system in accordance with claim 1, wherein the system further comprises a second louver device configured to substantially restrict a second field of view of the second image to the second person.

4. The system in accordance with claim 3, wherein the first louver device and the second louver device overlay the display device.

5. The system in accordance with claim 3, wherein the first louver device and the second louver device include a layer of advanced light control film.

6. The system in accordance with claim 1, wherein the display device includes
   a display element configured to display the first image on a first portion of the display element and display the second image on a second portion of the display element distinct from the first portion;
   an optical element configured to direct the first image to the first person and direct the second image to the second person.

7. The system in accordance with claim 1, wherein the display device includes
   a display element configured to display the first image during a first time period and display a second image during a second time period distinct from the first time period; and
   an optical element interposed between the display element and the display location, said optical element configured to direct the first image to the first person during the first time period and direct the second image to the second person during the second time period.

8. The system in accordance with claim 7, wherein the optical element includes a switchable minor characterized as having a transparent state and a reflective state.

* * * * *